(12) United States Patent
Galyean

(10) Patent No.: US 9,381,858 B2
(45) Date of Patent: Jul. 5, 2016

(54) LASER GUIDED DOCKING APPARATUSES AND METHODS OF MAKING AND USING THE SAME

(71) Applicant: Virgle Galyean, Dekalb, IL (US)

(72) Inventor: Virgle Galyean, Dekalb, IL (US)

(*) Notice: Subject to any disclaimer, the term of this patent is extended or adjusted under 35 U.S.C. 154(b) by 0 days.

(21) Appl. No.: 14/221,044

(22) Filed: Mar. 20, 2014

(65) Prior Publication Data

US 2014/0283398 A1 Sep. 25, 2014

Related U.S. Application Data

(60) Provisional application No. 61/803,507, filed on Mar. 20, 2013.

(51) Int. Cl.
*G01B 11/27* (2006.01)
*B60Q 9/00* (2006.01)
*B60Q 1/48* (2006.01)

(52) U.S. Cl.
CPC ............... *B60Q 9/002* (2013.01); *B60Q 1/484* (2013.01); *B60Q 2400/50* (2013.01)

(58) Field of Classification Search
CPC ..................... B60Q 9/002; B60Q 2400/50
USPC ................................... 33/286, 288
See application file for complete search history.

(56) References Cited

U.S. PATENT DOCUMENTS

| | | | |
|---|---|---|---|
| 4,214,266 A | 7/1980 | Myers | |
| 4,941,263 A * | 7/1990 | Hirshberg | E04H 6/426 116/28 R |
| 5,539,990 A | 7/1996 | Le | |
| 5,987,762 A * | 11/1999 | Toth | G01B 11/27 33/227 |
| 6,280,057 B1 | 8/2001 | O'Meara | |
| 6,374,507 B1 * | 4/2002 | Lehto | G01B 11/27 33/286 |
| 6,422,728 B1 * | 7/2002 | Riggin | B60Q 1/16 340/475 |
| 6,622,390 B2 * | 9/2003 | Brusius | G01C 15/00 33/286 |
| 6,851,198 B1 * | 2/2005 | Harty | A63B 71/0605 33/289 |
| 6,886,266 B2 * | 5/2005 | Kidd | G01B 5/255 33/203.18 |
| 6,889,441 B2 * | 5/2005 | Seiffert | G01B 11/27 33/286 |
| 7,164,352 B2 * | 1/2007 | Nelson | B60Q 1/52 340/472 |
| 7,178,250 B2 * | 2/2007 | Nash | G01C 15/004 33/286 |
| 7,464,478 B2 * | 12/2008 | Adrian | B23B 49/00 33/286 |
| 7,748,127 B1 * | 7/2010 | Cosimano | G01C 15/002 33/286 |
| 8,893,395 B2 * | 11/2014 | Mickow | G01C 15/002 33/286 |
| 9,024,740 B2 * | 5/2015 | Min | B60Q 1/085 340/425.5 |
| 2001/0029675 A1 * | 10/2001 | Webb | G01C 15/00 33/286 |
| 2006/0179671 A1 | 8/2006 | Ghatak | |
| 2006/0283029 A1 * | 12/2006 | Jan | G01C 15/002 33/286 |
| 2011/0216199 A1 * | 9/2011 | Trevino | B60D 1/36 348/148 |
| 2013/0160312 A1 * | 6/2013 | Zhang | G01R 31/001 33/354 |

OTHER PUBLICATIONS

International Search Report and Written Opinion of PCT Pat. App. No. PCT/US15/121564, International filing date Mar. 1, 2015.

* cited by examiner

*Primary Examiner* — G. Bradley Bennett
(74) *Attorney, Agent, or Firm* — Scherrer Patent & Trademark Law, P.C.; Stephen T. Scherrer; Monique A. Morneault

(57) ABSTRACT

The present invention relates to laser guided tractor trailer docking apparatuses and methods of making and using the same. Specifically, apparatuses are provided for projecting a laser line emanating from a tractor trailer loading dock to guide a tractor trailer driver backing the tractor trailer into proper position at the loading dock.

15 Claims, 3 Drawing Sheets

LASER GUIDED DOCKING APPARATUSES AND METHODS OF MAKING AND USING THE SAME

The present invention claims priority under 35 U.S.C. 119 (d) to U.S. Provisional Patent Application No. 61/803,507, titled "Laser Guided Docking Apparatus and Methods of Making and Using the Same," filed Mar. 20, 2013, which is incorporated herein by reference in its entirety.

TECHNICAL FIELD

The present invention relates to laser guided truck docking apparatuses and methods of making and using the same. Specifically, apparatuses are provided for projecting a laser line emanating from a truck loading dock to guide a tractor trailer driver backing the tractor trailer into proper position at the loading dock.

BACKGROUND

It is, of course, generally known to provide loading docks in building for the loading and unloading of products and items into and out of a truck trailer. Specifically, a loading dock is a recessed bay in a building or facility where trucks are loaded and unloaded. They are commonly found on commercial and industrial buildings and warehouses in particular. Loading docks may be exterior, flush with the building envelope, or fully enclosed. They are part of a facility's service or utility infrastructure, typically providing direct access to staging areas, storage rooms, and freight elevators.

A typical loading dock 10 is illustrated in FIG. 1, which is labeled as prior art. Specifically, the loading dock 10 may optionally include a plurality of features, including a door 11, such as an overhead door as illustrated in FIG. 11 and bumpers 12, 14 which protect the dock from truck damage and may also be utilized as a guide by the truck driver when backing up. In addition, the loading dock 10 may include a dock leveler 16, which may include a height-adjustable platform that may be used as a bridge between the dock and a truck, and may be operated by mechanical, hydraulic or air-powered systems. Further, the loading dock may include dock seals 18, 20, which are compressible foam blocks against which a truck may press when parked. Seals are typically used in colder climates to protect goods and people from the weather. Other options may include an overhead canopy 22 which may keep weather from entering the truck or the facility when unloading, and a truck restraint system 24 that may hold the truck in place so that it does not creep during loading and/or unloading of the same.

Another optional feature in a loading dock 10 may be painted lines 26, 28 that may extend from either side of the loading dock on the ground away from the loading dock 10 to aid a truck driver when backing the truck into proper position. However, the painted lines, typically yellow in color, may only be useful if they are visible to a truck driver when backing up the truck. Specifically, if the loading dock is not well maintained and the painted lines are allowed to fade or be removed from the ground, a truck driver will not be able to use them. In addition, if debris, such as leaves or snow covers the ground, the debris may cover the painted line rendering them not visible to a truck driver, and providing no aid to the truck driver.

In addition, while loading docks may have lights to help truck drivers back up trucks at night, the lights may not fully illuminate the painted lines on the ground, rendering them not visible to the truck driver when backing up the truck. Further, if the loading dock lights are not active, the truck driver may be required to back a truck up in darkness.

A need, therefore, exists for apparatuses for aiding a truck driver in backing a truck up to load at a loading dock. Specifically, a need exists for a laser guided truck docking apparatuses and methods of making and using the same.

In addition, a need exists for laser guided truck docking apparatuses that project at least one laser line onto the ground to aid a truck driver in backing a truck up to a dock. Moreover, a need exists for projecting at least one laser line away from a loading dock on the ground to ensure that the line is highly visible to a truck driver backing a truck into a loading dock.

Further, a need exists for a plurality of laser lines that may be projected on the wall next to a loading dock and further extend on the ground away from the loading dock to aid a truck driver in docking a truck. Still further, a need exists for laser guided truck docking apparatuses that are highly visible to a truck driver, no matter the weather conditions or lack of ambient illumination.

SUMMARY OF THE INVENTION

The present invention relates to laser guided tractor trailer docking apparatuses and methods of making and using the same. Specifically, apparatuses are provided for projecting a laser line emanating from a tractor trailer loading dock to guide a tractor trailer driver backing the tractor trailer into proper position at the loading dock.

To this end, in an embodiment of the present invention, a laser line generating apparatus is provided. The laser line generating apparatus is situated in proximity to a loading dock, the laser line generating apparatus projecting a line on at least the ground and emanating away from the loading dock to aid a truck driver in docking a truck to the loading dock.

It is, therefore, an advantage and objective of the present invention to provide apparatuses for aiding a truck driver in backing a truck up to a loading dock.

Specifically, it is an advantage and objective of the present invention to provide laser guided truck docking apparatuses and methods of making and using the same.

In addition, it is an advantage and objective of the present invention to provide laser guided truck docking apparatuses that project at least one laser line onto the ground to aid a truck driver in backing a truck up to a dock.

Moreover, it is an advantage and objective of the present invention to provide for projecting at least one laser line away from a loading dock on the ground to ensure that the line is highly visible to a truck driver backing up a truck to a loading dock.

Further, it is an advantage and objective of the present invention to provide a plurality of laser lines that may be projected on the wall next to a loading dock and further extend on the ground away from the loading dock to aid a truck driver in docking a truck.

Still further, it is an advantage and objective of the present invention to provide for laser guided truck docking apparatuses that are highly visible to a truck driver, no matter the weather conditions or lack of ambient illumination.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to laser guided tractor trailer docking apparatuses and methods of making and using the same. Specifically, apparatuses are provided for projecting a laser line emanating from a tractor trailer loading dock to guide a tractor trailer driver backing the tractor trailer into proper position at the loading dock.

Figure 1:
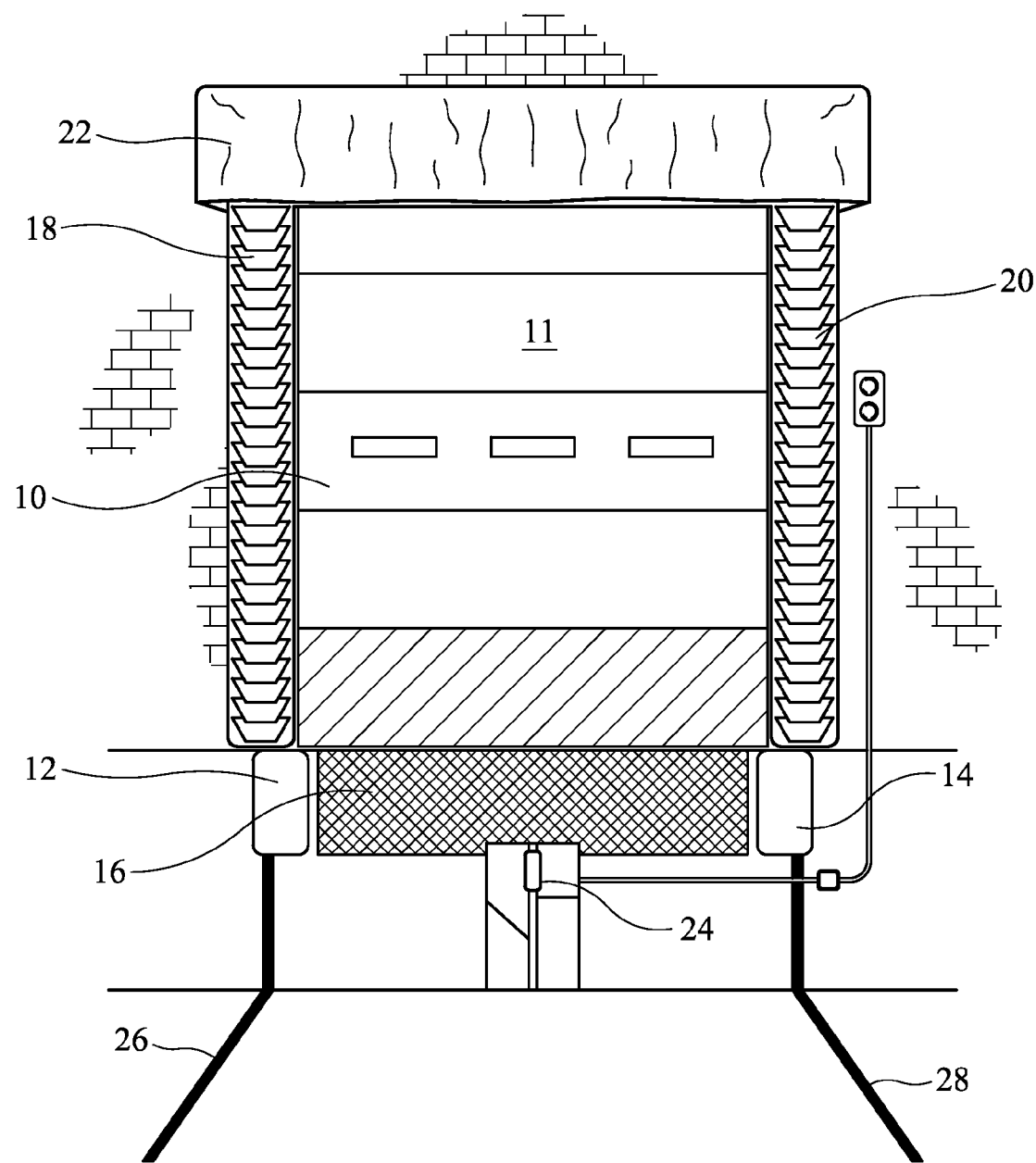
FIG. 1 illustrates a loading dock in a prior art illustration.
Figure 2:
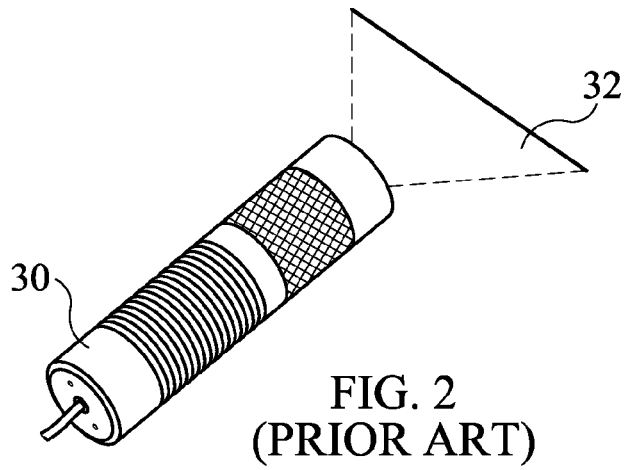
FIG. 2 illustrates a prior art laser line generating apparatus.
Figure 3:
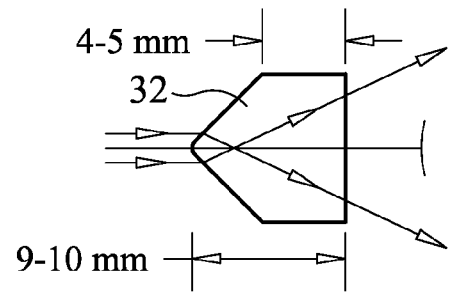
FIG. 3 illustrates a prior art lens useful for generating a laser line.
Figure 4:
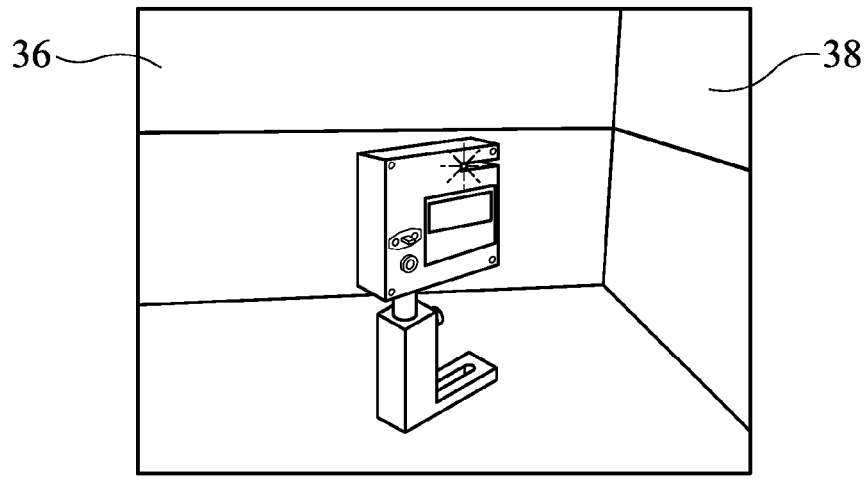
FIG. 4 illustrates a prior art laser line projected onto a first surface and a second surface at an angle to the first surface.

Now referring to the figures, wherein like numerals refer to like parts, FIG. 2 illustrates a prior art apparatus 30 for projecting a laser line 32. The apparatus 10 accomplishes this by utilizing special lenses, such as the prior art lens 34 illustrated in FIG. 3, which may expand a laser beam dot to form a projected laser line. Specifically, as illustrated in FIG. 2, a projected laser line may be viewable as a straight line when projected against a flat surface. More specifically, the laser line may be extended to a large extent if projected at an angle against a flat surface. In addition, the laser line may follow the contours of a second surface 36 meeting at an angle to a first surface 38. Specifically, a laser line may project on a surface disposed at a ninety degree angle to a first surface, as illustrated in FIG. 4.

Figure 5:
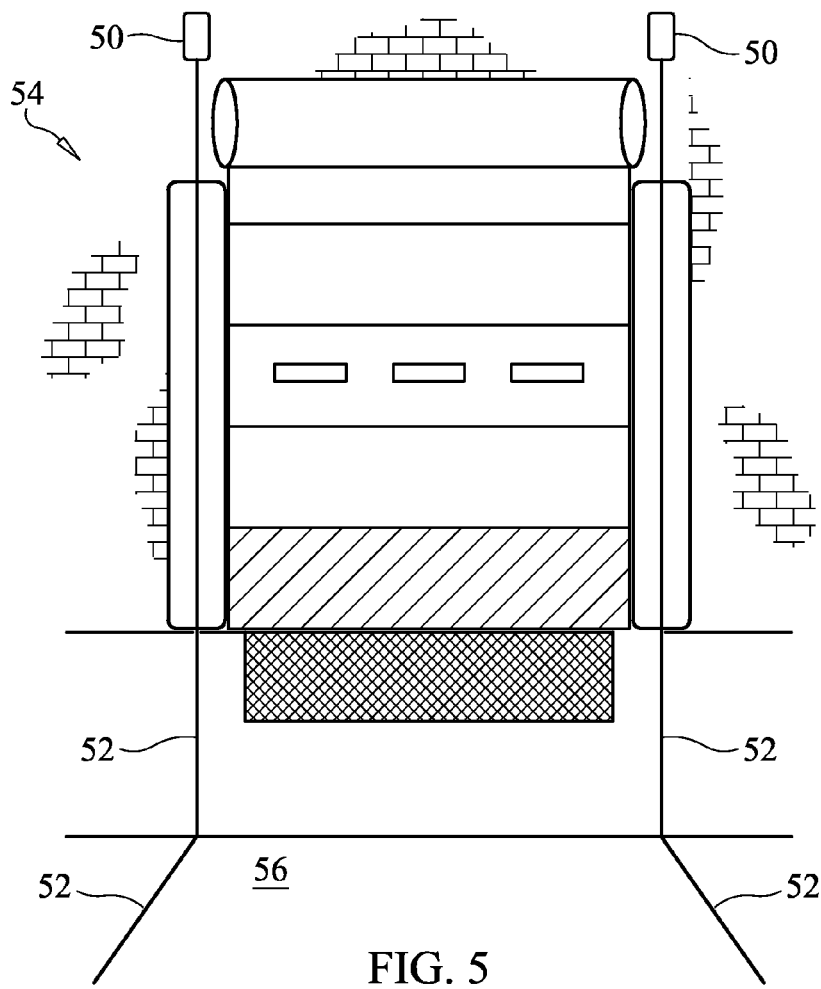
FIG. 5 illustrates a laser guided truck docking apparatus in an embodiment of the present invention.

Referring now to FIG. 5, in an embodiment of the present invention, a laser line generating apparatus 50 is provided for projecting a laser line 52 that may extend from a loading dock 54 to aid a truck driver in backing up a truck to the loading dock 54. In an embodiment, the apparatus 50 may project to the ground 56 on at least one side of a loading dock to aid a truck driver in following the line and aligning the truck to the loading dock. In a preferred embodiment one or a plurality of laser lines generated by one or a plurality of apparatuses 50 may project a laser line on the wall immediately adjacent the loading dock and on the ground emanating from the loading dock. In a particularly preferred embodiment, at least one line 52 may emanate on one side of the loading dock 54, and at least one line 54 may emanate on the other side of the loading dock 54 so that the truck driver may have visual aid in aligning the truck on either side of the truck.

The laser line generating apparatus 50, or plurality of laser line generating apparatuses, may be placed in any location that may accomplish the function of projecting laser lines on the sides and/or on the ground to aid a truck driver in backing a truck into a loading dock. Preferably, the laser line generating apparatus is disposed above the loading dock, projecting downwardly so as to project both on the wall on a side of the loading dock and on the ground emanating from the loading dock.

Figure 6:
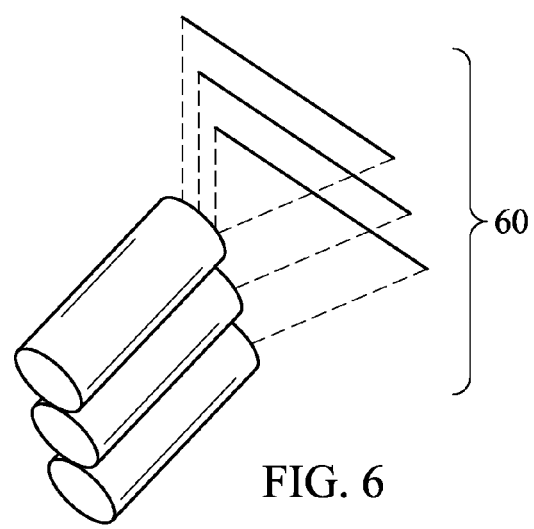
FIG. 6 illustrates a plurality of laser line generating apparatuses forming a plurality of parallel lines to aid in the visibility of the laser lines by a truck driver docking a truck in a loading dock in an embodiment of the present invention.

In another embodiment of the present invention, each projected line emanating on the sides of the loading dock 54 and/or emanating from the loading dock 54 on the ground 56 may comprise a plurality of laser lines 60 generated by one or a plurality of laser line generating apparatuses that may project the plurality of lines in parallel, as illustrated in FIG. 6. Thus, the plurality of laser lines 60 may work in concert together to provide a thicker, brighter laser line 52 for a truck driver to follow when projected on sides of the loading dock and/or emanating on the ground from the loading dock.

The laser guided truck docking apparatuses of the present invention may be particularly useful if there is debris on the ground, or if the ground is covered by ice and/or snow, as the laser line generated will project on the top of the debris, ice and/or snow, allowing the laser line to be visible no matter what is on the ground.

The present invention, as illustrated in FIGS. 5 and 6, show a single loading dock having the laser line guidance attached thereto. However, it should be noted that a plurality of loading docks may be provided, typically adjacent each other in a loading bay, and each may have laser guided apparatuses as detailed in the present disclosure associated therewith for aiding a truck driver in docking a truck thereto.

It should be noted that while the present invention is described for the specific purpose of aiding a truck driver in docking a truck to a loading dock, the apparatuses herein may be useful for projecting lines for guidance in other applications as well, such as onto parking lots where lines may be difficult to see in darkness or if covered, and the like, and the present invention should not be limited as described herein.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A laser line system comprising:
 a loading dock comprising a vertical surface disposed adjacent a horizontal surface upon which a truck traverses to load and unload goods at the loading dock;
 a first laser line generating apparatus situated immediately adjacent the vertical surface of the loading dock, the first laser line generating apparatus projecting a first line on both the vertical surface of the loading dock and the horizontal surface, the first line emanating both down the vertical surface of the loading dock and away from the loading dock on the horizontal surface to aid a truck driver in safely docking the truck to the loading dock.

2. The laser line system of claim 1 wherein the first laser line generating apparatus is situated above the loading dock.

3. The laser line system of claim 1 wherein the first laser line generating apparatus comprises a plurality of laser line generators aligned in parallel, wherein the plurality of laser line generators work in concert together to broaden the first line projected from the first line generating apparatus.

4. The laser line system of claim 1 further comprising a second laser line generating apparatus situated in proximity to the loading dock and a length away from the first laser line generating apparatus, the second laser line generating apparatus projecting a second line on at least the surface and emanating away from the loading dock to aid the truck driver in docking the truck to the loading dock, wherein the second line is parallel with the first line.

5. The laser line system of claim 4 wherein the length the second laser line generating apparatus is away from the first laser line generating apparatus is greater than a width of the truck.

6. The laser line system of claim 4 wherein the second laser line generating apparatus comprises a plurality of laser line generators aligned in parallel, wherein the plurality of laser line generators work in concert together to broaden the second line projected from the second line generating apparatus.

7. The laser line system of claim 4 wherein the second laser line generating apparatus further projects the second line on the vertical surface.

8. The laser line system of claim 1 wherein the laser line generating apparatus comprises:
   a first laser generator and a first lens capable of expanding a laser beam dot to form a first projected laser line, the first lens being disposed in front of the first laser generator; and
   a second laser generator and a second lens capable of expanding a laser beam dot to form a second projected laser line, the second lens being disposed in front of the second laser generator;
   wherein the first laser generator and the second laser generator are aligned such that the first projected laser line is projected adjacent the second projected laser line.

9. The laser line system of claim 8 wherein the laser line generating apparatus further comprises:
   a third laser generator and a third lens capable of expanding a laser beam dot to form a third projected laser line, the third lens being disposed in front of the third laser generator;
   wherein the third laser generator is aligned with the first laser generator and the second laser generator such that the third projected laser line is projected adjacent the first projected laser line and the second projected laser line.

10. The laser line system of claim 8 wherein the first projected line and the second projected line are projected along the vertical surface.

11. The laser line system of claim 8 wherein the first projected line and the second projected line are projected along the horizontal surface.

12. A method of using a laser line for docking a truck, the method comprising the steps of:
   providing a loading dock comprising a vertical surface disposed adjacent a horizontal surface upon which a truck traverses to load and unload goods at the loading dock;
   providing a first laser line generating apparatus, the first laser line generating apparatus capable of projecting a first line; and
   situating the first laser line generating apparatus immediately adjacent the vertical surface of the loading dock;
   projecting a first laser line on both the vertical surface of the loading dock and the horizontal surface, the first line emanating both down the vertical surface of the loading dock and away from the loading dock on the horizontal surface to aid a truck driver in safely docking the truck to the loading dock.

13. The method of claim 12 further comprising the steps of:
   providing a second laser line generating apparatus, the second laser line generating apparatus configured to project a second laser line;
   situating the second laser line generating apparatus in proximity to the loading dock and a length away from the first laser line generating apparatus; and
   projecting the second laser line on the horizontal surface, the second line emanating away from the loading dock to aid a truck driver in docking a truck to the loading dock.

14. The method of claim 12 wherein the first laser line generating apparatus is situated above the loading dock.

15. The method of claim 13 wherein the second laser line generating apparatus is situated above the loading dock, further comprising the steps of:
   projecting the second laser line on the vertical surface.

* * * * *